US009216365B2

(12) United States Patent
Kuo

(10) Patent No.: US 9,216,365 B2
(45) Date of Patent: Dec. 22, 2015

(54) TREATMENT METHOD AND DEVICE OF WASTE RESOURCE

(71) Applicants:Chuang Jung, Tainan (TW); Chun-Pao Kuo, Tainan (TW)

(72) Inventor: Chun-Pao Kuo, Tainan (TW)

(73) Assignees: Chuang Jung, Tainan (TW); Chun-Pao Kuo, Tainan (TW)

( * ) Notice: Subject to any disclaimer, the term of this patent is extended or adjusted under 35 U.S.C. 154(b) by 299 days.

(21) Appl. No.: 13/758,068

(22) Filed: Feb. 4, 2013

(65) Prior Publication Data

US 2013/0199917 A1    Aug. 8, 2013

(30) Foreign Application Priority Data

Feb. 7, 2012   (TW) .............................. 101103827 A

(51) Int. Cl.
| | |
|---|---|
| *B01D 5/00* | (2006.01) |
| *C10B 53/07* | (2006.01) |
| *C10K 1/04* | (2006.01) |
| *C10K 1/32* | (2006.01) |
| *C10B 53/00* | (2006.01) |
| *F23G 5/027* | (2006.01) |

(52) U.S. Cl.
CPC .............. *B01D 5/0078* (2013.01); *C10B 53/00* (2013.01); *C10K 1/04* (2013.01); *C10K 1/32* (2013.01); *F23G 5/027* (2013.01)

(58) Field of Classification Search
CPC ...... C10B 53/00; C10B 53/07; B01D 5/0078; B01D 5/0093; C10K 1/04; C10K 1/32; F23G 5/027

USPC ........... 201/1, 25, 27, 30; 585/241; 423/449.7
See application file for complete search history.

(56) References Cited

U.S. PATENT DOCUMENTS

| | | | |
|---|---|---|---|
| 7,642,394 B1 * | 1/2010 | Carle et al. ...................... 201/30 |
| 2006/0163053 A1 * | 7/2006 | Ershag ............................ 201/25 |

* cited by examiner

*Primary Examiner* — Jill Warden
*Assistant Examiner* — Joye L Woodard
(74) *Attorney, Agent, or Firm* — Alan D. Kamrath; Kamrath IP Lawfirm, P.A.

(57) ABSTRACT

A waste resource treatment method and device include pyrolysis desorption treatment elements having one or more pyrolysis desorption chambers connected in parallel. Sub-temperature fractionation treatment elements having a low-temperature fractionating pipe and a plurality of higher-temperature or high-temperature fractionating pipes for fractionating a gas at different temperature ranges are connected to the pyrolysis desorption chambers, respectively. The fractionating pipes are connected to sub-temperature resource recycling treatment elements for treating the gas at different temperature ranges, respectively. The sub-temperature resource recycling treatment elements are connected to refrigeration-liquefaction treatment elements and to adsorption exhaust treatment elements. The gas produced at different temperature ranges during a heating process performed inside the pyrolysis desorption chambers undergoes a resource recycling treatment and then is collected by refrigeration-liquefaction, and eventually undergoes adsorption exhaust treatment, such that various hazardous substances are sorted before applying to a resource application or undergoing further treatment.

7 Claims, 4 Drawing Sheets

TREATMENT METHOD AND DEVICE OF WASTE RESOURCE

BACKGROUND OF THE INVENTION

1. Technical Field

The present invention relates to a treatment method and device of waste resource, such that a pyrolysis gas produced in the course of a heating process performed at different temperatures during a pyrolysis desorption process performed on hazardous waste can be sorted and recycled by condensation, dust collection, refrigeration-liquefaction, and adsorption, to effectuate waste sorting and recycling.

2. Description of Related Art

With transportation being in increasingly great demand and in increasingly wide use, tires are utilized and replaced to an increasingly large degree, thereby bringing about approximately 100,000 tons of waste tires per year. If waste tires on this enormous scale keep growing and are left untreated, they will aggravate the current predicaments of environmental protection and hygiene. Conventional waste tire treatment technologies applied domestically and abroad fall into four categories, namely prototype utilization, crushing treatment, pyrolysis, and tire-derived fuel (TDF). However, at present, most waste tire treatment plants in Taiwan recycle waste tires by the crushing treatment. Although recycling waste tires by the crushing treatment is technically simple, it has intractable drawbacks, namely generating low resource reuse values, facing an undeveloped market of reclaimed rubber, rubber, and asphalt, generating high-vibration noise of a high decibel level, and producing dust. As regards the tire-derived fuel, its refineries contribute to environmental protection related problems, such as air pollution, drainage, and by-product disposal, not to mention that it still fails to effectuate reuse of resources. Furthermore, the reuse of waste tires does no more than prolonging the lifecycle of waste tires and thus has a large impact on the environment in the long term, not to mention that it does not actually achieve reuse of resources.

Hence, the pyrolysis method is currently one of the most advanced methods for extracting related materials from waste tires. When performed on waste tires, vacuum pyrolysis yields pyrolysis gas, pyrolysis oil, pyrolytic recycled carbon black (recycled carbon), and steel yarn. The pyrolysis gas functions as tire-derived fuel for use in a reactor or a boiler installed in a waste tire treatment plant. After undergoing fractional distillation, desulfurization, decolorization, and deodorization, pyrolysis oil turns into diesel and heavy oil for sale or for use as fuel oil. The steel yarn is regarded as waste steel to be recycled or for sale. The recycled carbon is purified, activated, quality-modified, and subjected to grinding treatment to become a high-reinforcement carbon-containing material and a high-porosity carbon-containing material.

Over the past several years, although searchers managed to extract the aforesaid related materials from waste tires successfully by pyrolysis and enable part of recycled carbon to serve a low-level purpose, say, functioning as a rubber filler, pyrolysis of waste tires is confronted with problems, namely, an overly high sulfur content and pungency of pyrolysis oil-derived diesel and heavy oil, and presence of residual impurities, such as carbon black and coke. As a result, the aforesaid materials extracted by pyrolysis, namely pyrolysis gas, pyrolysis oil, pyrolytic recycled carbon black (recycled carbon), and steel yarn, do not meet the environmental regulations and standards set forth in Taiwan, and thus cannot be marketed as a fuel.

Accordingly, crucial issues confronting Taiwan-based waste tire pyrolysis recycling plants include low resources utilization rate, and inadequate pyrolysis production resource technology. That is to say, the industrial sector nowadays has to address an issue, that is, the resource treatment performed on a pyrolysis gas extracted from waste tires by combustion and pyrolysis thereof has hitherto not been carried out in accordance with the properties of the pyrolysis gas.

SUMMARY OF THE INVENTION

In view of the fact that various existing waste tire treatment methods fail to actually solve the problems confronting recycling, the present invention provides waste resource treatment method and device whereby gases of different properties, which are extracted at different temperatures from waste by pyrolysis desorption, undergo condensation, dust collection, refrigeration-liquefaction, and adsorption exhaust, step by step, such that various ingredients of the waste are extracted at different temperatures during the pyrolysis desorption process to thereby achieve a resource actually.

The present invention provides a waste resource treatment device, comprising: a pyrolysis desorption treatment element for performing pyrolysis desorption treatment; a plurality of sub-temperature fractionation treatment elements connected to the pyrolysis desorption treatment element, adapted to fractionate a pyrolysis gas at different temperature ranges, and having a low-temperature fractionating pipe and higher-temperature or high-temperature fractionating pipes; a plurality of sub-temperature resource recycling treatment elements adapted to perform sub-temperature resource recycling treatment, connected to the fractionating pipes, and adapted to treat the pyrolysis gas at different temperature ranges, respectively; a refrigeration-liquefaction treatment element connected to the sub-temperature resource recycling treatment elements and adapted to perform refrigeration-liquefaction on the pyrolysis gas and collect it; and an adsorption exhaust treatment element connected to the refrigeration-liquefaction treatment element and adapted to perform adsorption exhaust treatment on the gaseous end product to thereby extract related substances therefrom.

As regards the aforesaid waste resource treatment method and device, the fractionating pipes of the sub-temperature fractionation treatment elements are parallel-connected to main open/close valves installed on the pyrolysis desorption treatment element, and the fractionating pipes are each equipped with a fractionation open/close valve.

As regards the aforesaid waste resource treatment method and device, the pyrolysis desorption treatment element comprises one or more pyrolysis desorption chambers connected in parallel, with the pyrolysis desorption chambers connected to the self-contained sub-temperature fractionation treatment elements, respectively. The sub-temperature fractionation treatment elements comprise the fractionating pipes having thereon fractionation open/close valves, respectively, and parallel-connected to main open/close valves disposed on the pyrolysis desorption chambers, respectively. A low-temperature fractionating pipe and a plurality of higher-temperature or high-temperature fractionating pipes installed in the sub-temperature fractionation treatment elements and adapted to fractionate the pyrolysis gas at the same temperature range are connected to different total valves, respectively, and then to the sub-temperature resource recycling treatment elements, respectively.

As regards the aforesaid waste resource treatment method and device, the sub-temperature resource recycling system linked to the low-temperature fractionating pipe comprises a condensation collection unit linked to the fractionating pipes, such that the rear end of the condensation collection unit is connected to the refrigeration-liquefaction treatment element.

As regards the aforesaid waste resource treatment method and device, the rear end of the condensation collection unit is connected to a pyrolysis gas sensor and then to a first switching valve having an exhaust outlet and a switch outlet which are linked to an exhaust pipe. The switch outlet of the first switching valve is connected to a second switching valve having a combustion fractionating end and a switch outlet, such that the combustion fractionating end of the second switching valve is connected to a combustion element, and the switch outlet of the second switching valve is connected to the refrigeration-liquefaction treatment element.

As regards the aforesaid waste resource treatment method and device, the sub-temperature resource recycling treatment elements linked to higher-temperature or high-temperature fractionating pipes comprises a dust collection element linked to the fractionating pipes, and the dust collection element is connected to a condensation collection unit connected to the refrigeration-liquefaction treatment element.

As regards the aforesaid waste resource treatment method and device, the adsorption exhaust treatment element comprises an activated carbon adsorption element connected to the sub-temperature resource recycling treatment elements. A pyrolysis gas sensor and a third switching valve having an exhaust outlet and a switch outlet are disposed in sequence at the rear end of the activated carbon adsorption element. An exhaust pipe is connected to the exhaust outlet of the third switching valve. The switch outlet of the third switching valve is connected to not only a chemicals adsorption element but also the activated carbon adsorption element.

As regards the aforesaid waste resource treatment method and device, the switch outlet of the third switching valve has a fourth switching valve having a switch outlet and a combustion fractionating end connected to a combustion element, and the switch outlet of the fourth switching valve is connected to the chemicals adsorption element.

Therefore, given the aforesaid treatment process flow of the present invention, a pyrolysis gas produced in the course of a heating process performed at different temperatures during a pyrolysis desorption process performed on waste can be sorted and recycled by fractionation, condensation, and dust collection. Afterward, various liquid and solid substances contained in the pyrolysis gas extracted at different temperature ranges are sorted and collected. Then, the remaining ingredients of the pyrolysis gas undergo refrigeration-liquefaction treatment, such that a tiny amount of residual liquefied substances are collected. Finally, it is only when the gaseous end product finishes undergo physical and chemical adsorption treatment that it can non-toxic exhaust in compliance with green regulations and hazard-free standards.

Accordingly, persons skilled in the art can gain insight into the present invention and implement the present invention by making reference to the embodiments below and the accompanying drawings.

DETAILED DESCRIPTION OF THE EMBODIMENTS OF THE INVENTION

Figure 1:
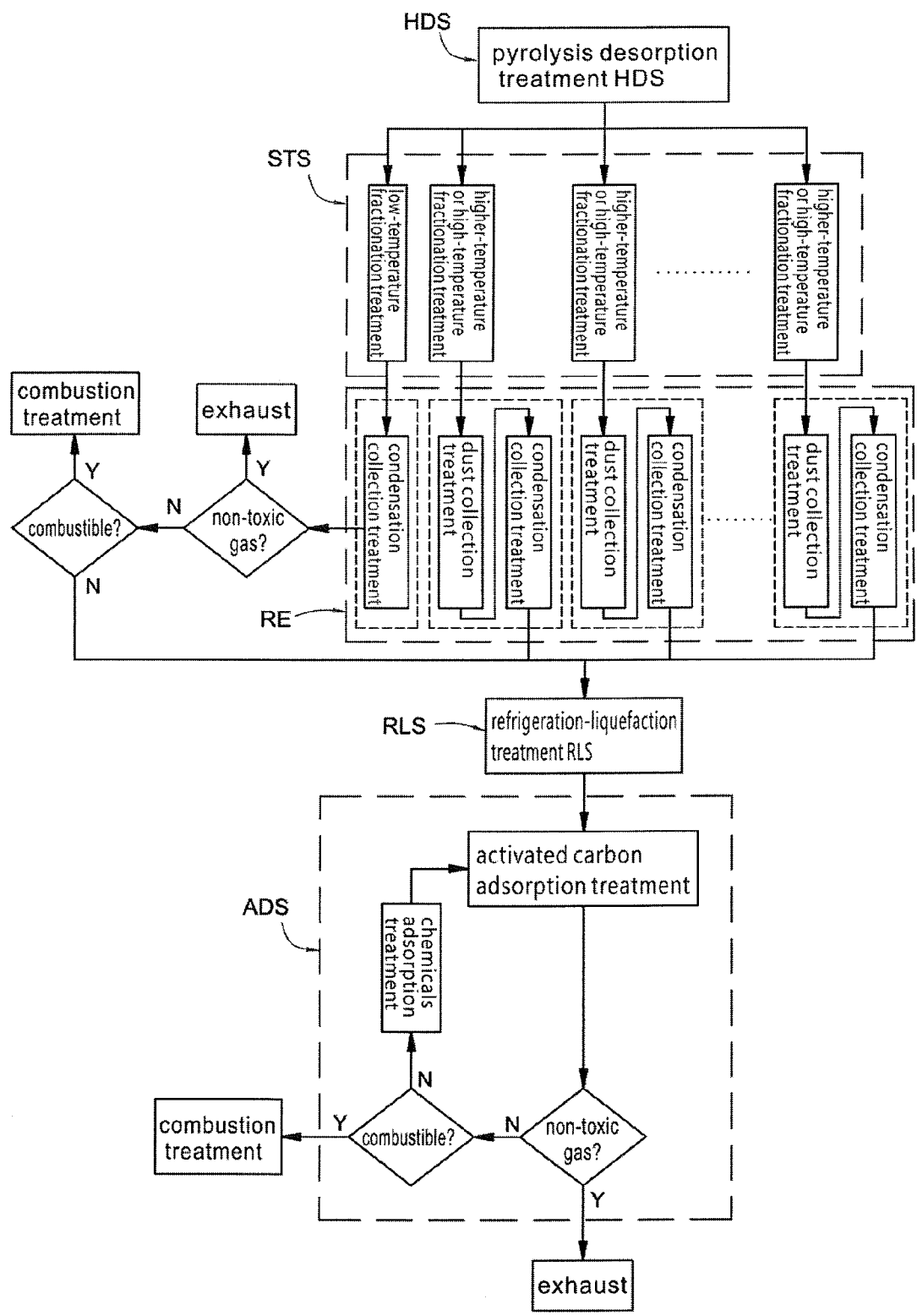
FIG. 1 is a schematic view of a treatment process flow according to the present invention.
Figure 2:
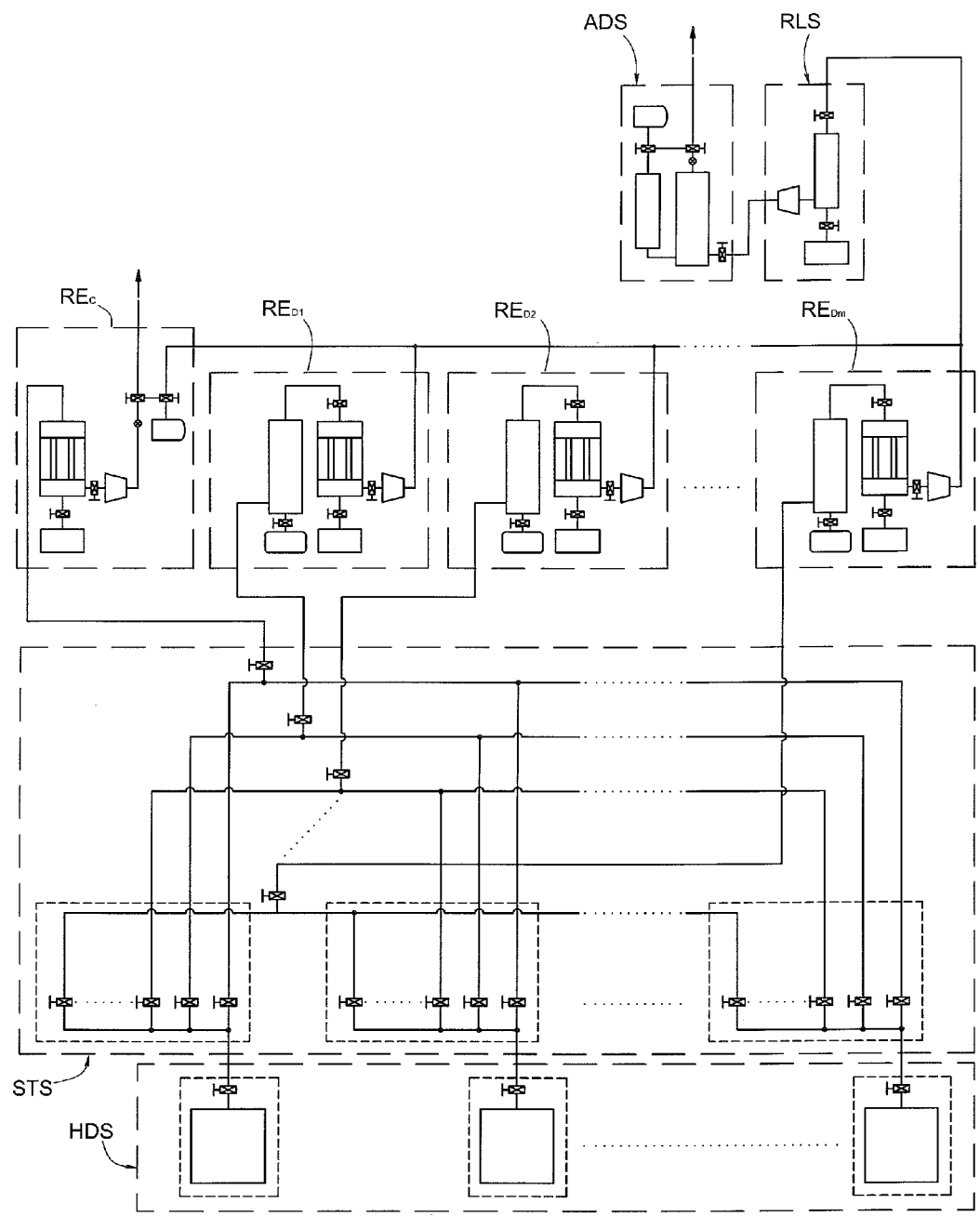
FIG. 2 is a schematic view of a device according to the present invention.

Referring to FIGS. 1, 2, the present invention provides a waste treatment method that entails: performing heating-based pyrolysis desorption treatment on waste by a pyrolysis desorption treatment element (HDS), such that a pyrolysis gas is extracted, at different temperature ranges, from various substances contained in the waste in the course of heating the waste to raise its temperature gradually; fractionating the pyrolysis gas to sub-temperature resource recycling treatment elements ($RE_C$, $RE_{D1}$, $RE_{D2}$ ... $RE_{Dm}$) by sub-temperature fractionation treatment elements (STS) for performing low-temperature fractionation treatment, and higher-temperature and high-temperature fractionation treatment, respectively; performing liquefaction and solidification resource-oriented sub-temperature resource recycling treatment on the pyrolysis gas; collecting and delivering any gas which cannot be treated with the sub-temperature resource recycling treatment elements ($RE_C$, $RE_{D1}$, $RE_{D2}$ ... $RE_{Dm}$) to a refrigeration-liquefaction treatment element (RLS) for the gas to undergo further refrigeration-liquefaction treatment; and performing adsorption-based collection-oriented adsorption exhaust treatment on the final substances contained in the final pyrolysis gas by an adsorption exhaust treatment element (ADS), such that any non-toxic gas intended to be ultimately exhausted is in an environmentally-friendly manner.

The sub-temperature resource recycling treatment performed upon completion of the low-temperature fractionation treatment entails performing condensation collection treatment on the pyrolysis gas. The treated pyrolysis gas meeting green exhaust standards is exhausted. An inflammability test operation is performed on the remaining pyrolysis gas. An incineration treatment is performed on the remaining pyrolysis gas if the inflammability test result indicates that the pyrolysis gas is inflammable. The refrigeration-liquefaction treatment is performed on the remaining pyrolysis gas if the inflammability test result indicates that the pyrolysis gas is not inflammable. The sub-temperature resource recycling treatment performed upon completion of the higher-temperature or high-temperature sub-temperature fractionation treatment entails performing dust collection treatment on the pyrolysis gas to extract solid substances therefrom, performing condensation collection treatment on the pyrolysis gas to extract liquid substances therefrom, and performing the refrigeration-liquefaction treatment on the pyrolysis gas.

The adsorption exhaust treatment entails performing an activated carbon adsorption exhaust treatment on the gaseous end product, exhausting the treated gaseous end product if it meets green exhaust standards, and otherwise performing an inflammability test operation if the treated gaseous end product does not meet green exhaust standards. If the inflammability test result indicates that the gaseous end product is inflammable, incineration treatment will be performed on the gaseous end product. Otherwise, if the inflammability test results indicate that the gaseous end product is not inflammable, a chemicals adsorption treatment will be performed. After the chemicals absorption treatment, the activated carbon adsorption exhaust treatment is performed again, for the aforesaid treatments to recur until the gaseous end product meets green exhaust standards.

Figure 3:
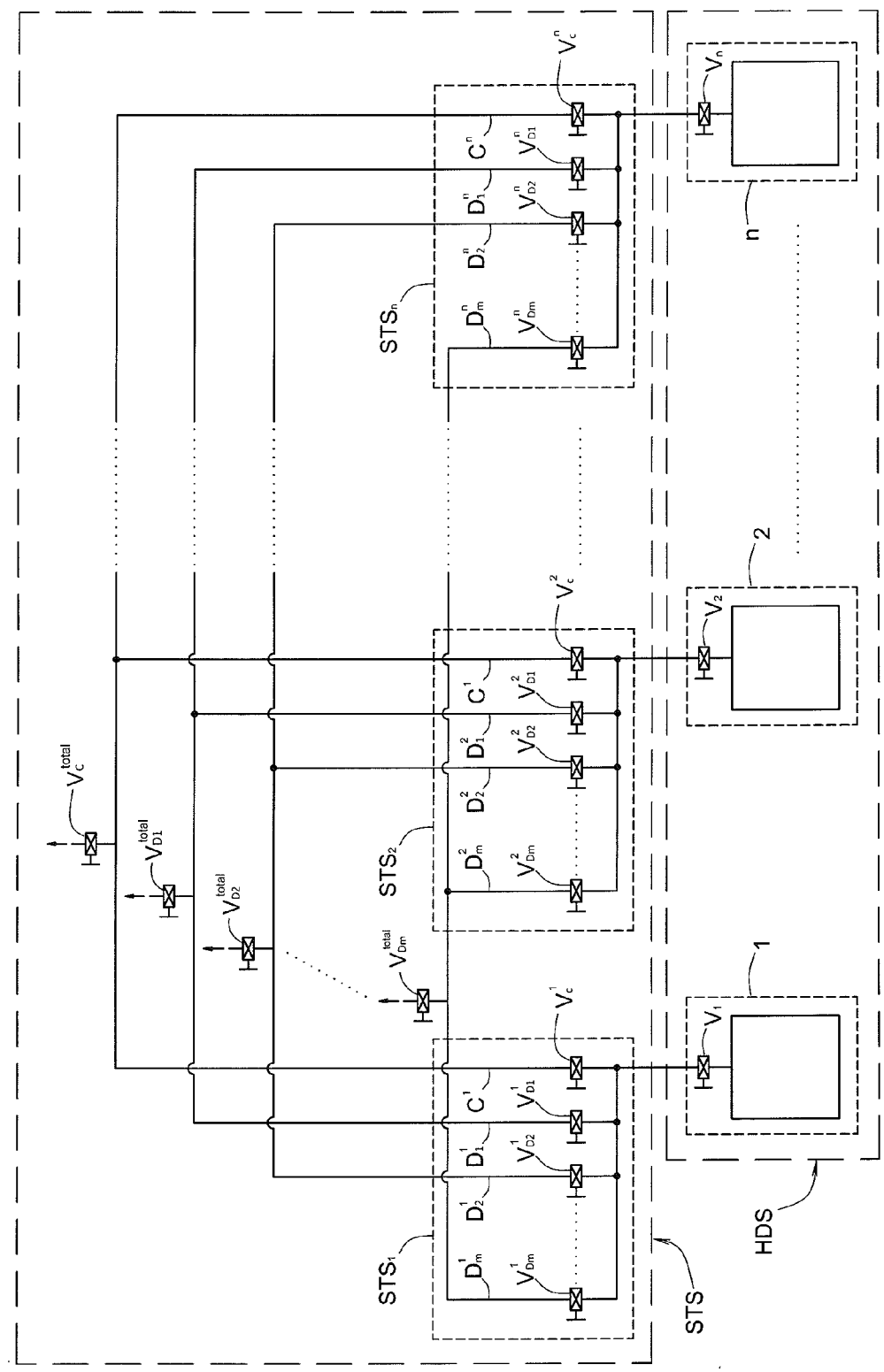
FIG. 3 is a schematic view of a pyrolysis desorption treatment element and sub-temperature fractionation treatment elements according to the present invention.

Structural details of the pyrolysis desorption treatment element (HDS), the sub-temperature fractionation treatment elements (STS), the sub-temperature resource recycling treatment elements ($RE_C$, $RE_{D1}$, $RE_{D2}$ ... $RE_{Dm}$), the refrigeration-liquefaction treatment element (RLS), and the adsorption exhaust treatment element (ADS) are illustrated with FIG. 3 and described below.

The pyrolysis desorption treatment element (HDS) comprises one or more pyrolysis desorption chambers (1, 2, 3, ... n) connected in parallel. Thermalcouples for measuring the internal temperature of the chambers are installed on the chambers, respectively. Furthermore, main open/close valves ($V_1, V_2 ... V_n$) are installed at gas outlets of the chambers, respectively, and linked to sub-temperature systems ($STS_1$, $STS_2$ ... $STS_n$) of the sub-temperature fractionation treatment elements (STS) of the chambers, respectively. Detachable connection pipes are connected between the pyrolysis desorption chambers (1, 2, 3, ... n) and the sub-temperature systems ($STS_1$, $STS_2$ ... $STS_n$), respectively, such that the pyrolysis desorption chambers (1, 2, 3, ... n) can be separately and independently uninstalled and loaded with the waste to be treated, and can undergo pyrolysis desorption treatment separately and independently in a way independent of each other.

The sub-temperature fractionation treatment elements (STS) each comprise one or more sub-temperature systems ($STS_1$, $STS_2$ ... $STS_n$) connected in parallel. Low-temperature fractionating pipes ($C^1, C^2 ... C^n$), and a plurality of higher-temperature or high-temperature fractionating pipes ($D_1^1, D_1^1 ... D_m^1$), ($D_1^2, D_2^2 ... Dm^2$) ... ($D_1^n, D_2^n ... D_m^n$) are installed on the sub-temperature systems ($STS_1, STS_2 ... STS_n$), respectively. After the fractionating pipes have been mounted thereon with fractionation open/close valves ($V_c^1$, $V_c^2 ... V_c^n$) and ($V_{D1}^1, V_{D2}^1 ... V_{Dm}^n$), respectively, the fractionating pipes are parallel-connected to the main open/close valves ($V_1, V_2 ... V_n$) of the pyrolysis desorption chambers (1, 2, ... n), respectively. Then, the fractionating pipes ($C^1, C^2 ... C^n$) of the sub-temperature systems ($STS_1$, $STS_2 ... STS_n$) are connected to a total valve ($V_C^{total}$). The fractionating pipes ($D_1^1, D_2^1 ... D_m^1$) are connected to a total valve ($V_{D1}^{total}$). The fractionating pipes ($D_1^2, D_2^2 ... D_m^2$) are connected to a total valve ($V_{D2}^{total}$). By analogy, the fractionating pipes ($D_1^n, D_2^n ... D_m^n$) are connected to a total valve ($V_{Dm}^{total}$).

Figure 4:
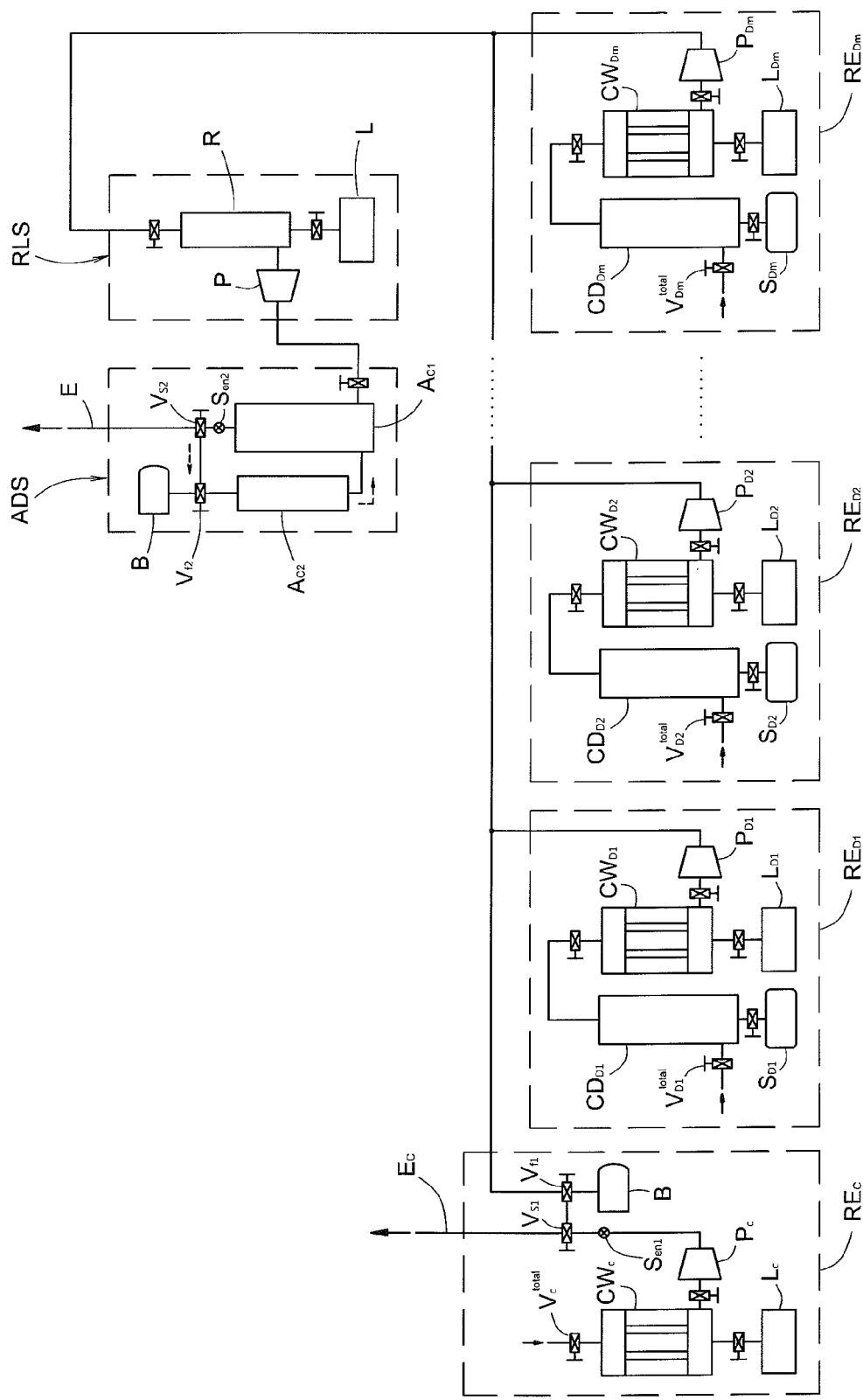
FIG. 4 is a schematic view of sub-temperature resource recycling treatment elements, a refrigeration-liquefaction treatment element, and an adsorption exhaust treatment element according to the present invention.

Referring to FIG. 4, as regards the sub-temperature resource recycling treatment elements ($RE_C, RE_{D1}, RE_{D2} ...$ REDm), the total valves ($V_C^{total}, V_{D1}^{total}, V_{D2}^{total} ... V_{Dm}^{total}$) connected to the fractionating pipes connected to the sub-temperature systems ($STS_1, STS_2 ... STS_n$) are linked to the sub-temperature resource recycling treatment elements ($RE_C, RE_{D1}, RE_{D2} ... RE_{Dm}$), respectively. The sub-temperature resource recycling treatment element ($RE_C$) linked to the fractionating pipes ($C^1, C^2 ... C^n$) is connected to a condensation collection unit ($CW_C$) via the total valve ($V_C^{total}$). A liquid-collecting chamber ($L_C$) for collecting condensation liquid is installed on the condensation collection unit ($CW_C$) and, then, connected to a first switching valve ($V_{s1}$) via a vacuum pump ($P_C$) and a pipeline equipped with a pyrolysis gas sensor ($S_{en1}$). The first switching valve ($V_{s1}$) has an exhaust outlet linked to an exhaust pipe ($E_C$) for use in exhaust that complies with standards of environment protection, a switch outlet connected to a second switching valve ($V_{f1}$) and connected to a combustion element (B) via a combustion fractionating end of the second switching valve ($V_{f1}$), and a switch outlet connected to the refrigeration-liquefaction treatment element (RLS). The sub-temperature resource recycling treatment elements ($RE_{D1}, RE_{D2} ... RE_{Dm}$) linked to the remaining ones of the fractionating pipes ($D_1^1, D_2^1 ... D_m^1$), ($D_1^2, D_2^2 ... D_m^2$) ... ($D1^n, D2^n ... Dm^n$) are connected via the total valves ($V_{D1}$total, $V_{D2}^{total} ... V_{Dm}^{total}$) to dust collection elements ($CD_{D1}, C_{D2} ... CD_{Dm}$) equipped with solid-collecting chambers ($S_{D1}, S_{D2}, ... S_{Dm}$) for collecting solid substances, respectively, then linked to condensation collection units ($CW_{D1}, CW_{D2} ... CW_{Dm}$) equipped with liquid-collecting chambers ($L_{D1}, L_{D2} ... L_{Dm}$) for collecting condensation liquid, and finally connected to the refrigeration-liquefaction treatment element (RLS) via vacuum pumps ($P_{D1}, P_{D2} ... P_{Dm}$), respectively.

The refrigeration-liquefaction treatment element (RLS) is connected to the sub-temperature resource recycling treatment elements ($RE_C, RE_{D1}, RE_{D2} ... RE_{Dm}$) and thus has a refrigeration-liquefaction apparatus (R) with a liquid-collecting chamber (L), and then it is connected to the adsorption exhaust treatment element (ADS) via a vacuum pump (P).

The adsorption exhaust treatment element (ADS) comprises an activated carbon adsorption element ($A_{C1}$) connected to the refrigeration-liquefaction treatment element (RLS). The back end of the activated carbon adsorption element ($A_{C1}$) is connected to a chimney (E) for exhausting exhaust gas. A third switching valve ($V_{s2}$) and a pyrolysis gas sensor ($S_{en2}$) for detecting hazardous substances are installed on the chimney (E). The third switching valve ($V_{s2}$) not only has an exhaust outlet through which exhaust gas is passed and delivered along the chimney (E) outlet therefrom in a condition in compliance with green exhaust standards, but also has a switch outlet connected to a fourth switching valve ($V_{f2}$). The combustion fractionating end of the fourth switching valve ($V_{f2}$) is connected to a combustion element (B). The switch outlet of the fourth switching valve ($V_{f2}$) is connected to a chemicals adsorption element ($A_{C2}$) and then connected into the activated carbon adsorption element ($A_{C1}$).

Accordingly, the aforesaid treatment elements are used to perform the following treatment steps as illustrated with an embodiment below.

The pyrolysis desorption chambers (1, 2, 3 ... n) are each loaded with the waste to be treated. Then, with the detachable connection pipes, the main open/close valves ($V_1, V_2 ... V_n$) are in communication with the low-temperature fractionating pipes ($C^1, C^2 ... C^n$) and the higher-temperature or high-temperature fractionating pipes ($D_1^1, D_2^1 ... D_m^1$), ($D_1^2, D_2^2 ... D_m^2$) ($D_1^n, D_2^n ... D_m^n$) to not only control the heating process taking place within the chambers but also to measure the variation of temperature within the chambers continuously, to enable the fractionation open/close valves ($V_c^1$, $V_c^2 ... V_c^n$) and ($V_{D1}^1, V_{D2}^1 ... V_{Dm}^n$) to start or shut down in accordance with the gas that contains different substances extracted by desorption and pyrolysis which take place at different predetermined temperature ranges, and thus fractionate gas at different temperature ranges by the fractionating pipes ($C^1, C^2 ... C^n$), ($D_1^1, D_2^1 ... D_m^1$) ... ($D_1^n, D_2^n ... D_m^n$), as shown in the table below:

| fractionation open/close valves | The operation temperature range of fractionation valve | The closes temperature range of fractionation valve |
|---|---|---|
| $V_c^1, V_c^2 ... V_c^n$ | $T_P^{n-1-n} \leq 160°$ C. | $T_P^{n-1-n} > 160$ |
| $V_{D1}^1, V_{D1}^2 ... V_{D1}^n$ | $150°$ C. $\leq$ $T_P^{n-1-n} \leq T_{D1}$ | $T_P^{n-1-n} < 150$ or $T_P^{n-1-n} > T_{D1}$ |
| $V_{D2}^1, V_{D2}^2 ... V_{D2}^n$ | $T_{D1}$-$10°$ C. $\leq$ $T_P^{n-1-n} \leq T_{D2}$ | $T_P^{n-1-n} < T_{D1}$-$10°$ C. or $T_P^{n-1-n} > T_{D2}$ |
| ... | ... | ... |
| $V_{Dm}^1, V_{Dm}^2 ... V_{Dm}^n$ | $T_{D(m-1)} \leq T_P^{n-1-n}$ | $T_P^{n-1-n} < T_{D(m-1)}$ | n: the number of pyrolysis desorption chambers.
$T_P$: the temperature variation measured in the course of a heating process taking place in pyrolysis desorption chambers.
$T_D$: start/shutdown temperature of fractionation open/close valves ($V_c^1, V_c^2 ... V_c^n$) and ($V_{D1}^1, V_{D2}^1 ... V_{Dm}^n$).
m: the number of higher-temperature or high-temperature fractionating pipes.

Hence, as indicated by the embodiment illustrated with the above table, during the heating process taking place in each of the pyrolysis desorption chambers (1, 2, 3, ... n), with the heating temperature increasing continuously and gradually, the pyrolysis gas that falls within each temperature range is passed from the low-temperature fractionating pipes ($C^1$, $C^2 \ldots C^n$) to the higher-temperature or high-temperature fractionating pipes ($D_1^{\,1}$, $D_2^{\,1} \ldots D_m^{\,1}$), ($D_1^{\,2}$, $D_2^{\,2} \ldots D_m^{\,2}$) $\ldots$ ($D_1^{\,n}$, $D_2^{\,n} \ldots D_m^{\,n}$) in a low-temperature-to-high-temperature order, and thus fractionated to the respectively connected sub-temperature resource recycling treatment elements ($RE_{D1}$, $RE_{D2} \ldots RE_{Dm}$). The temperature $T_P^{\,n=1\sim n} \leq 160°$ C. of the pyrolysis gas fractionated by the low-temperature fractionating pipes ($C^1, C^2 \ldots C^n$) indicates that the pyrolysis gas is composed mostly of water. Hence, the pyrolysis gas can be condensed by the condensation collection unit ($CW_C$) of the connected sub-temperature resource recycling treatment element ($RE_C$) and collected in the liquid-collecting chamber ($L_C$). The other remaining gases are detected by the pyrolysis gas sensor ($S_{en1}$) to determine whether they meet green exhaust standards and thus fit to be exhausted from the exhaust pipe ($E_C$). Otherwise, inflammable substances are introduced via the second switching valve ($V_{f1}$) into the combustion element (B) and incinerated therein. Those substances which cannot be incinerated are delivered to the refrigeration-liquefaction apparatus (R) of the refrigeration-liquefaction treatment element (RLS) by a pipeline.

The pyrolysis gas fractionated by the higher-temperature or high-temperature fractionating pipes ($D_1^{\,1}$, $D_2^{\,1} \ldots D_m^{\,1}$), ($D_1^{\,2}$, $D_2^{\,2} \ldots D_m^{\,2}$) $\ldots$ ($D_1^{\,n}$, $D_2^{\,n} \ldots D_m^{\,n}$) at different temperature ranges tends to produce dust (particulate matter) at $T_P^{\,n=1\sim n} > 160°$ C. Hence, the higher-temperature or high-temperature fractionating pipes ($D_1^{\,1}$, $D_2^{\,1} \ldots D_m^{\,1}$), ($D_1^{\,2}$, $D_2^{\,2} \ldots D_m^{\,2}$) $\ldots$ ($D_1^{\,n}$, $D_2^{\,n} \ldots D_m^{\,n}$) are connected to the dust collection elements ($CD_{D1}$, $CD_{D2} \ldots CD_{Dm}$) to allow solid substances to be collected in solid-collecting chambers ($S_{D1}$, $S_{D2}$, $\ldots S_{Dm}$) and then passed through the condensation collection units ($CW_{D1}$, $CW_{D2} \ldots CW_{Dm}$) for condensable substances to be collected in the liquid-collecting chambers ($L_{D1}, L_{D2} \ldots L_{Dm}$). Afterward, the residual gas is introduced via the vacuum pumps ($P_{D1}, P_{D2} \ldots P_{Dm}$) into the refrigeration-liquefaction apparatus (R) of the refrigeration-liquefaction treatment element (RLS) by a pipeline.

The refrigeration-liquefaction apparatus (R) of the refrigeration-liquefaction treatment element (RLS) further performs a refrigeration-liquefaction operation on the gas. The liquefiable liquid is collected in the liquid-collecting chamber (L). The unliquefiable residual gas is introduced via the vacuum pump (P) into the activated carbon adsorption element ($A_{C1}$) of the adsorption exhaust treatment element (ADS) to undergo a primary substance adsorption operation. The gas which cannot be adsorbed and thus remains has to be detected and analyzed with the pyrolysis gas sensor ($S_{en2}$) on the chimney (E). If the analysis result indicates that the residual gas meets green exhaust standards, the residual gas will be directly exhausted from the chimney (E) through the third switching valve ($V_{s2}$). Otherwise, if the analysis result indicates that the residual gas does not meet green exhaust standards, substances are introduced via the fourth switching valve ($V_{f2}$) into the combustion element (B) and incinerated therein. Those substances which cannot be incinerated are delivered via a pipeline to the chemicals adsorption element ($A_{C2}$) to undergo a secondary adsorption operation and then return to the activated carbon adsorption element ($A_{C1}$) to undergo an adsorption operation again. The aforesaid process flow recurs until the gas meets green exhaust standards and thus is permitted to be exhausted from the chimney (E).

Hence, waste undergoes pyrolysis desorption to produce gas at different temperature ranges during a heating process. Then, the pyrolysis gas is subjected to fractionation, condensation, and dust collection. Liquid ingredients and solid ingredients of the products extracted at different temperatures are collected. Afterward, the gas which previously undergoes condensation and dust collection now undergoes refrigeration-liquefaction treatment again to collect a residual trace of liquefied substances. At last, it is only when the gaseous end product undergoes two adsorption treatment processes that the exhaust gas complies with green regulations and hazard-free standards, and that, prior to the exhaust of the gas, the inflammable ingredients of the gas are destroyed and removed by a high-temperature gas (such as a gas produced by combustion) or combustion.

Although the aforesaid embodiment discloses and describes the present invention and serves as preferred embodiments thereof, persons skilled in the art understand that any changes in forms and methodology they may make to the aforesaid embodiments of the present invention should not depart from the spirit and scope of the present invention.

What is claimed is:

1. A waste resource treatment device comprising: a pyrolysis desorption treatment element; a plurality of fractionation treatment elements connected to the pyrolysis desorption treatment element, wherein the plurality of fractionation treatment elements fractionate a pyrolysis gas at different temperature ranges and have a first-temperature fractionating pipe and second-temperature fractionating pipes, with the second-temperature being higher than the first-temperature; a refrigeration-liquefaction treatment element connected to the second-temperature fractionating pipes; and an adsorption exhaust treatment element connected to the refrigeration-liquefaction treatment element, wherein a condensation collection unit is connected to the first-temperature fractionating pipe and to a pyrolysis gas sensor and then to a first switching valve having an exhaust outlet and a switch outlet which are linked to an exhaust pipe, wherein the switch outlet of the first switching valve is connected to a second switching valve having a combustion fractionating end and a switch outlet, wherein the combustion fractionating end of the second switching valve is connected to a combustion element, and wherein the switch outlet of the second switching valve is connected to the refrigeration-liquefaction treatment element.

2. The waste resource treatment device of claim 1, wherein the fractionating pipes of the plurality of fractionation treatment elements are parallel-connected to a main open/close valve and to the pyrolysis desorption treatment element, and wherein the fractionating pipes have thereon fractionation open/close valves, respectively.

3. The waste resource treatment device of claim 1, wherein the pyrolysis desorption treatment element comprises two or more pyrolysis desorption chambers connected in parallel, with the pyrolysis desorption chambers connected to the plurality of fractionation treatment elements, respectively, with the plurality of fractionation treatment elements comprising the fractionating pipes having thereon fractionation open/close valves, respectively, and parallel-connected to main open/close valves disposed on the two or more pyrolysis desorption chambers, respectively, wherein the first-temperature fractionating pipe and the second-temperature fractionating pipes installed in the plurality of fractionation treatment elements and fractionating the pyrolysis gas at a same temperature range are connected to different main open/close valves, respectively.

4. A waste resource treatment device comprising: a pyrolysis desorption treatment element; a plurality of fractionation treatment elements connected to the pyrolysis desorption treatment element, wherein the plurality of fractionation treatment elements fractionate a pyrolysis gas at different temperature ranges and have a first-temperature fractionating pipe and second-temperature fractionating pipes, with the second-temperature being higher than the first-temperature; a refrigeration-liquefaction treatment element connected to the second-temperature fractionating pipes; and an adsorption exhaust treatment element connected to the refrigeration-liquefaction treatment element, wherein the adsorption exhaust treatment element comprises an activated carbon adsorption element and a chemical adsorption element connected to the activated carbon absorption element, and an exhaust pipe equipped with a pyrolysis gas sensor, wherein a switching valve having an exhaust outlet and a switch outlet is disposed on the exhaust pipe at a rear end of the pyrolysis gas sensor, and wherein the switch outlet of the switching valve is connected to the chemicals adsorption element.

5. The waste resource treatment device of claim 4, wherein each of the second-temperature fractionating pipes comprises a condensation collection unit connected to the refrigeration-liquefaction treatment element.

6. The waste resource treatment device of claim 4, wherein the each of the second-temperature fractionating pipes includes a dust collection element connected to a condensation collection unit connected to the refrigeration-liquefaction treatment element.

7. The waste resource treatment device of claim 4, wherein the switch outlet of the switching valve has a further switching valve having a switch outlet and a combustion fractionating end connected to a combustion element, and wherein the switch outlet of the further switching valve is connected to the chemicals adsorption element.

* * * * *